Sept. 25, 1928.
W. B. JUPP
1,685,569
REMOVABLE UNIT MOUNTING
Filed Aug. 19, 1927
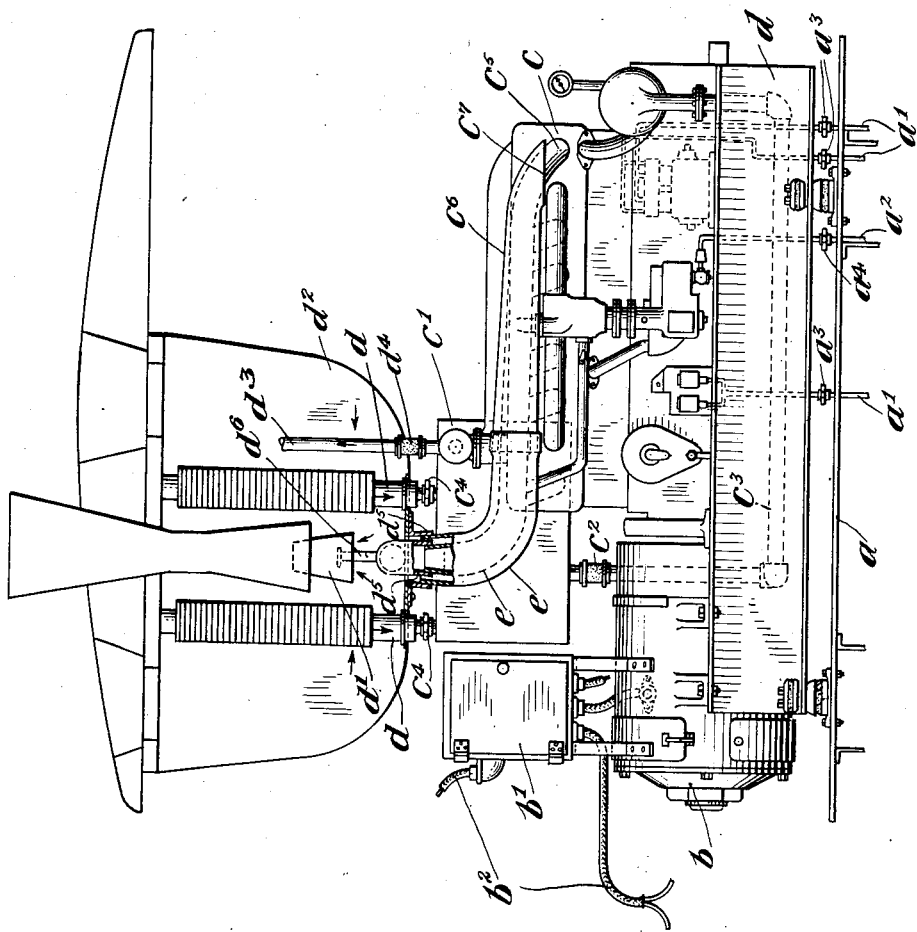
INVENTOR.
William B. Jupp
BY
Redding, Greeley, O'Shea & Campbell
his ATTORNEYS.

Patented Sept. 25, 1928.

1,685,569

UNITED STATES PATENT OFFICE.

WILLIAM B. JUPP, OF BROOKLYN, NEW YORK, ASSIGNOR TO INTERNATIONAL MOTOR COMPANY, OF NEW YORK, N. Y., A CORPORATION OF DELAWARE.

REMOVABLE-UNIT MOUNTING.

Application filed August 19, 1927. Serial No. 214,125.

The present invention relates to removable unit mountings for power units which are to be used in connection with auxiliary apparatus which is permanently mounted in the correct relation to the power units to effect proper operation of the plant.

More particularly, the invention relates to mountings of the above type when used in connection with a power unit comprising an internal combustion engine and an electric generator mounted upon a unitary base and being associated with auxiliary apparatus such as, radiators, exhaust eductors, filling ducts, gasoline lines and the necessary control cables.

Where units of this character are used upon rail cars to supply the driving power thereto, it is highly desirable that the power units be readily replaceable. The great cost of the rolling stock requires that it be in service the maximum amount of time and in view of this fact the power units, when in need of repair, must be readily removable.

Accordingly, an object of this invention is to provide a construction wherein the necessary auxiliary apparatus is mounted in the most convenient locations, and the connections therebetween and the power units such that the latter may be readily removed without disturbing the mounting of the auxiliary structure.

A further object is to provide a mounting of the above type wherein the power units are mounted upon a unitary base and the structure so designed that the connections to the auxiliary apparatus are reduced to a minimum and the character thereof simple and permitting them to be removed quite readily.

Further and other objects will be apparent as the description proceeds and reference will now be had to the accompanying drawings forming a part hereof for a more detailed description of the invention, wherein:

The single figure of the drawings is an elevation, partly in section, showing a mounting for a power unit mounted according to the present invention, together with the auxiliary apparatus used in connection with the power unit and the removable connections between the unit and such apparatus.

Referring to the above figure, $a$ designates the floor plate or base upon which the unit is carried, the air connections being illustrated at $a'$ and the gasoline line at $a^2$. Suitable removable connections $a^3$ and $a^4$, respectively, may be provided to connect these lines with the corresponding points on the power unit. The unit, comprising a generator $b$ and internal combustion engine $c$, is mounted upon channel sections $d$ which form a bed plate for the above machines and form them into a unitary construction. Upon the generator $b$ is located a fuse box $b'$ or other suitable control panel from which leads $b^2$ extend to be connected to the control line and battery and driving motor.

The internal combustion engine $c$ includes an exhaust and cooling system which coact with the auxiliary apparatus as follows. A collecting tank $c'$, for collecting the water which passes through the radiators and is to be returned to the engine is carried at one side of the unit and may either be mounted securely therewith or formed as a demountable section which is carried with the auxiliary apparatus. A closed connection $c^2$ is provided between the collecting tank and the return pipe $c^3$ to the water pump in order that the tank may be removed with facility if occasion demands. At the upper side of the collecting tank are provided, in this instance, two removable connections $c^4$, comprising lock washers and nuts to provide a water tight joint. The exhaust manifold of the engine is indicated at $c^5$ over which a shroud $c^6$ is secured. The shroud is open at its lower end section as indicated at $c^7$ to permit air to be drawn in at one end of the exhaust manifold and pass along the length thereof. Operating in conjunction with the cooling system of the engine and the exhaust manifold is an auxiliary apparatus comprising pipes $d$ which drive water from a roof radiator (not shown) and an exhaust eductor $d'$ which is enclosed in a housing $d^2$. The exhaust from the manifold is introduced into the lower of a series of Venturi throats $d'$ and the passage of the exhaust gases through these throats produces a suction which causes a flow of air from the housing $d^2$. The roof radiators may be mounted in the housing and the flow of air thus produced is drawn through the radiators for cooling purposes. A pipe $d^3$ is provided with a hose connection $d^4$ and carries water from the engine to the roof radiators. At the lower portion of the housing $d^2$, circumferential flanges $d^5$ are secured, one flange lying inside of, and coaxial to the other. To connect the exhaust manifold and shroud to the exhaust nozzle $d^6$ of the eductor and the housing $d^2$ respectively, inner and outer elbows $e$ and $e'$ are provided. These elbows have enlarged end sections to fit over the exhaust manifold $c^5$ and shroud $c^6$ respectively. The upper ends of the elbows are adapted to rest lightly within the circumferential flanges $d^5$, and in this manner form a connection between the auxiliary apparatus and the engine which may be readily removed when it is desired to replace the unit.

It will be seen that the connections between the auxiliary apparatus and the unit are reduced to a minimum and positioned above the unit so that when the latter is moved simultaneously the auxiliary apparatus will be in a position such that it will not interfere with, or impede the free movement of the unit. The gas line and air connections are all at the floor and below the base unit and are readily removable since they comprise the usual washer and nut connection. The electrical control includes only a conduit, or conduits, which may be readily disconnected by means of a block or blocks. It will be seen that the above construction enables a power unit to be removed quite readily. In this manner the vehicles upon which they are to be used may be maintained in constant operation.

The construction embodying this invention is not to be limited save as defined in the appended claims.

What I claim is:

1. A mounting for an internal combustion engine and electric generator mounted as a unit, auxiliary apparatus including exhaust and radiator elements, and means to mount the latter in a plane above that of the engine and generator unit to permit the unit to be removed by movement in a substantially horizontal plane.

2. A mounting for an internal combustion engine and electric generator mounted as a unit, auxiliary apparatus including exhaust and radiator elements, means to mount the elements in a plane above that of the unit, and removable connections between the elements and the unit disposed in a plane between that of the auxiliary apparatus and the unit.

3. A mounting for an internal combustion engine and electric generator mounted as a unit, auxiliary apparatus including exhaust and radiator elements, means to mount the elements above the unit, a single connection between the engine exhaust manifold and the exhaust element, and removable connections between the engine and the radiator element, the last named connections being disposed in a horizontal plane between that of the unit and the auxiliary apparatus and in the plane of the connections between the exhaust manifold and the exhaust element.

4. A mounting for an internal combustion engine and electric generator mounted as a unit, auxiliary apparatus including a radiator, an exhaust eductor, a housing therefor, means to mount the apparatus above the unit, removable connections between the radiator and the unit and disposed in a plane between that of the auxiliary apparatus and the unit, and a removable connection between the bottom of the eductor and the exhaust manifold in the plane of the removable connections, whereby the unit may be readily removed.

5. A mounting for an internal combustion engine and electric generator mounted as a unit, auxiliary apparatus including a radiator, an exhaust eductor, a housing therefor, connections whereby the eductor produces a flow of air through the radiator, means to mount the apparatus above the unit, removable connections between the radiator and the unit and disposed in a plane between that of the auxiliary apparatus and the unit, a shroud over the exhaust manifold, and a removable L-connection connecting the bottom of the eductor housing and the shroud and the eductor and the exhaust manifold, said L-construction being in the plane of the first named connections, whereby the unit may be readily removed.

This specification signed this 17th day of August A. D. 1927.

WILLIAM B. JUPP.